March 20, 1951    V. ISACCO    2,545,736
ROTATING WING PARACHUTE
Filed Feb. 2, 1948    3 Sheets-Sheet 1

Inventor
Vittorio Isacco
By

Attorney

March 20, 1951     V. ISACCO     2,545,736

ROTATING WING PARACHUTE

Filed Feb. 2, 1948     3 Sheets—Sheet 2

Inventor
Vittorio Isacco
Attorney

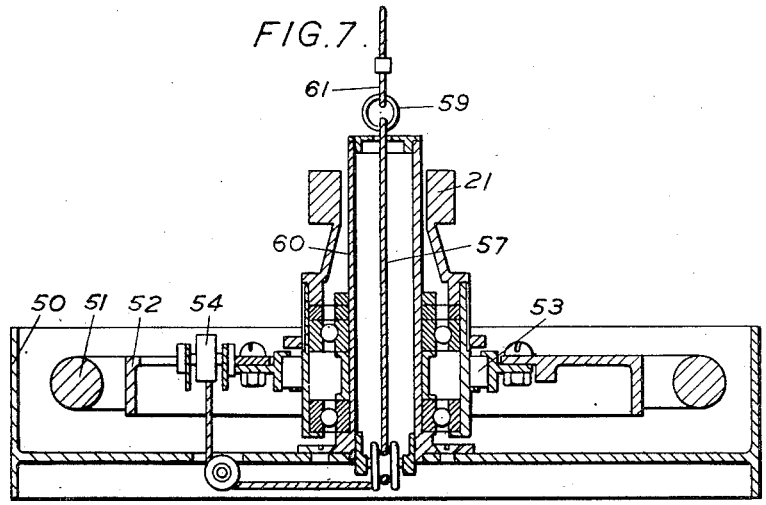
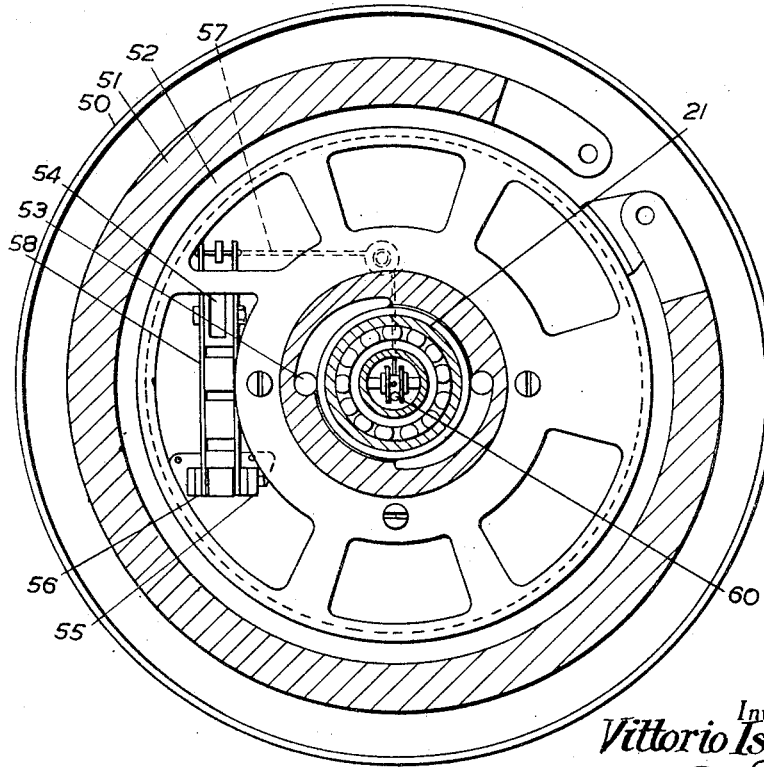

Patented Mar. 20, 1951

2,545,736

UNITED STATES PATENT OFFICE 2,545,736

ROTATING WING PARACHUTE

Vittorio Isacco, London, England

Application February 2, 1948, Serial No. 5,803
In Great Britain July 19, 1946

Section 1, Public Law 690, August 8, 1946
Patent expires July 19, 1966

6 Claims. (Cl. 244—138)

This invention has reference to improvements in and relating to rotating wing parachutes such as, for example, those described in the specifications of my copending applications as follows:

Serial No. 598,111, filed June 7, 1945 and issued December 28, 1948 as Patent No. 2,457,376;

Serial No. 598,112, filed June 7, 1945 and issued January 11, 1949, as Patent No. 2,458,855;

Serial No. 649,674, filed February 23, 1946 and issued May 9, 1950 as Patent No. 2,506,873; and Serial No. 710,266, filed November 16, 1946.

The present invention has for its object a sustaining propeller comprising two or more blades each of telescopic form and means to automatically regulate the pitch angle of the blades according to their speed of rotation. This adapts the propeller to better autorotating conditions during the different phases of a descent.

In fact, it is well known that when the pitch angle of the blades are set at a small positive value as in all autorotating machines, the expected autorotation will not take place if the angle of attack resulting from the speeds of descent and the speed of rotation of the blades is beyond 24°. This is what would take place for the rotating wing parachutes, where the speeds of descent are relatively great and the speed of rotation at the early stage of fall is very low.

To remedy such unavoidable conditions of speeds in the rotating wing parachutes, it has been found that this setback is overcome if the blades are set before use and therefore at the early stages of the fall, with a negative pitch angle.

If this negative angle was to remain during all the descent, then the vertical speed would become very great and unacceptable in practice. The pitch angle is, therefore, bound to become progressively positive up to the value giving the best autorotating efficiency. This is the object of the present invention, which is realized by the adjunction of an automatic pitch control mechanism which increases the pitch angle of the blades from the negative value of start to the positive value required for the steady vertical descent.

The telescopic blades as described in copending applications Nos. 598,111, 598,112 and 649,674 had their pitch angle set in a fixed position with regard to their root-attachments. In application No. 710,266 the pitch angle was under the control of the pilot.

Also in the rotating wings described in copending applications Nos. 598,112 and 710,266 the inner fork of each blade was articulated around a horizontal axis, this axis being inclined towards the leading edge, and not perpendicular to the longitudinal axis of the blade. This disposition, essential for stability purposes, produced an automatic decrease of the pitch angle of the blades when their flapping movement was upwards, and an increase of the said pitch angle when their flapping movement was downwards.

This automatic change of the pitch angle of the blades due to their flapping movement is entirely different in its scope and in its mode of operation from the automatic device incorporated in parachutes according to the present invention.

The present device has for its object to change the pitch angle of the blades, only when there is a variation in their speed of rotation, increasing in the most usual cases the pitch angle when the speed of rotation increases and decreasing this pitch angle when rotation decreases.

A further object of the invention is to provide pitch control mechanism comprising a mass rotatable simultaneously with the blades and arranged to increase and to decrease the pitch angle of the latter in conformity with the rise and fall of their rate of rotation, said mass being movable under centrifugal force on the one hand and under means producing an opposing force on the other hand.

These devices being associated with the horizontal fork of the blade's attachment, participates in any flapping movement of these blades without effect on their pitch angle if the speed of rotation is not altered, but acts on the pitch as stated above, when the speed of rotation is altered. It is, therefore, a new feature applicable, for example, to the Rotating Wing Parachutes described in the aforesaid specifications.

In the accompanying drawings which show the invention by way of example:

Figs. 7 and 8 show the internal starting device, by means of an elastic cord.

The constructional features and the means for initial starting into rotation of the blades, have already been described in the specifications of my previous patent applications. I shall, therefore, describe them hereafter more briefly.

Figure 1:
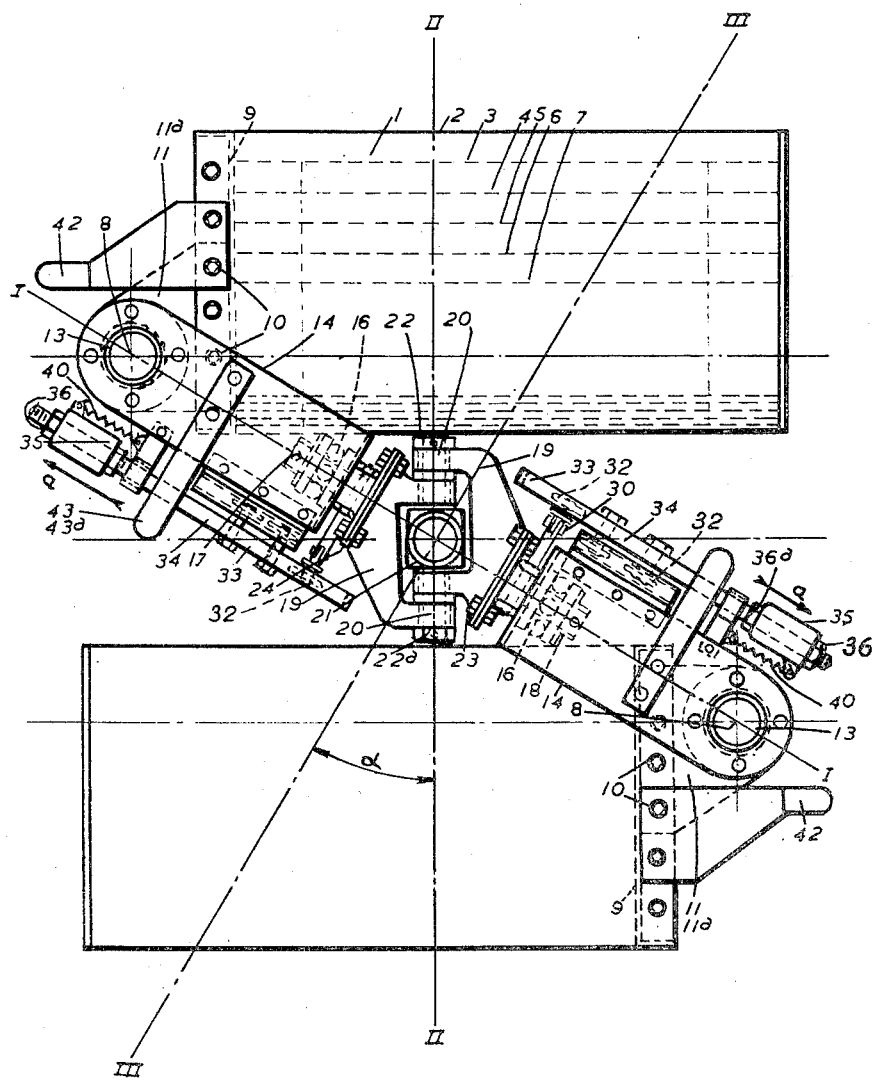
Fig. 1 is a top view of the propeller of the rotating wing parachute fitted with the centrifugal, automatic pitch angle control mechanism.
Figure 1:
Figure 2:
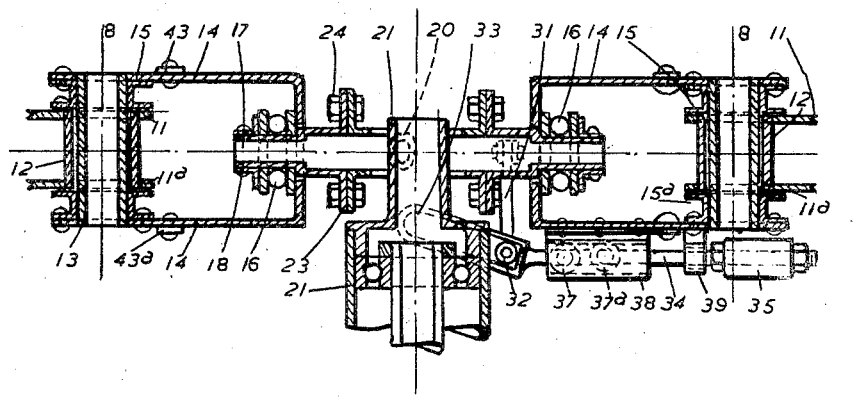
Fig. 2 is a section on the axis II of Fig. 1, with the blades hinged in flight position.
Figure 3:
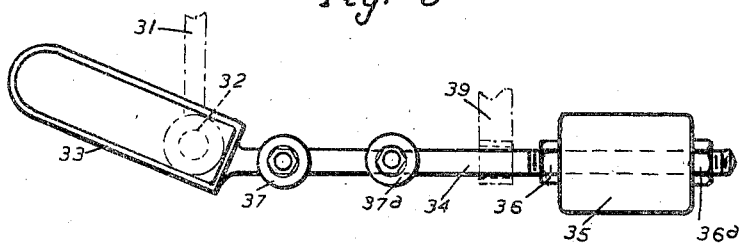
Fig. 3 shows part of the said control mechanism on a larger scale.

The blades 1, comprise a number of telescopic elements of precise aerofoil section as described particularly in specification of copending application No. 710,266. In Fig. 1 only six sections numbered (2, 3, 4, 5, 6 and 7) are indicated.

The blades 1 are hinged at rest around axis 8, but this vertical hinging axis is constituted in a different way from that described in the last-named application. That is to say, to the root end 9 of the largest or first element 2 of each of the blades, is attached by means of bolts 10 a pair of plates 11, 11$^a$ and a tube 12 is rigidly fixed to each pair of plates.

The plates 11, 11$^a$ and the tube 12 can freely rotate around the tube 13 which constitutes the vertical hinging axis 8. The tube 13 is fixed between the two legs of the vertical fork 14. Distance pieces 15 15$^a$ maintain the plates 11, and 11$^a$ in position. When the blades are in their position of rest they partly enter the fork 14 (see Fig. 1).

The yoke of the vertical fork 14 bears against a thrust ball bearing 16 mounted on the tube 17, a thrust nut 18 keeping the whole system in position.

The tube 17 is attached to the horizontal fork 19 which can freely rotate around trunnions 20 rigid with the rotating hub 21 of the propeller. Nuts 22—22$^a$ maintain this fork in position.

The trunnions 20 constitute the horizontal flapping axis II, II which makes, as explained in the specifications of my previous patent applications an angle $a$ with the axis III, III, which latter axis is perpendicular to the longitudinal axis I, I of the blades.

The tube 17 is attached to the horizontal fork 19 by means of flanges 23 solid with the said fork and by bolts 24.

It is evident that the vertical fork 14, and, therefore, the blades 1 are free to rotate around the axis I, I which rotation would result in a change of the pitch angle of the blades.

The centrifugal device which regulates automatically the pitch angle of the blades according to their speed of rotation, is constituted as follows.

Figure 4:
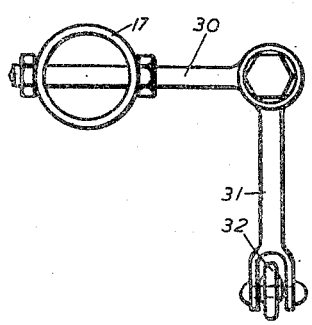
Figs. 4 and 5 are side elevations of details of the said mechanism.
Figure 5:
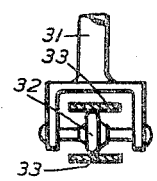

To the tube 17 is fixed a lever 30 (Fig. 4) to which is attached the rod 31 ending with a roller 32. This assembly of tube 17, lever 30 and the rod 31, constitute the relatively fixed support regulating the pitch angle, since they cannot rotate around the longitudinal axis I, I. They can only flap around axis II, II but the blades, the forks 14 and all other parts attached to these forks follow this flapping movement.

Roller 32 of rod 31 can freely rotate between the top and bottom walls of an inclined track 33 which constitutes the extension of a rod 34 at the end of which is fixed a weight 35 maintained in a suitable position by means of nuts 36—36$^a$.

On the rod 34 are attached two rollers 37—37$^a$ which can roll inside a guideway 38 fixed to the vertical fork 14, said guideway being parallel with the axis I, I. The rod 34 is, therefore, free to move along its axis, a support 39 attached also to the vertical fork 14 guiding the rod 34 when it so moves.

Thus, when the rate of rotation of the blades increases, the centrifugal force on the weight 35 will produce a sliding movement, according to arrow $a$ of the whole system constituted by the weight 35, the rod 34 the rollers 37—37$^a$ and finally the inclined track 33. But track 33 bears against the roller 32, forming part of a relative fixed point as explained above. It is, therefore, the track 33 which has to descend on account of this sliding movement, this producing a lowering in the position of the whole system 32, 34 and 35, which is easily possible since the fork 14 can freely rotate around the axis I, I owing to the thrust ball-bearing 16; and the result is an increase in the pitch angle of the blades.

When rotation decreases, and the weight is pulled in a direction opposite to arrow $a$ by means of the compensating spring 40, the pitch angle of the blades is automatically decreased.

One method of starting the blades initially into rotation is given as an example with reference to Figs. 7 and 8.

Inside the case 50 of the apparatus is located an elastic cord 51 which is wound up around a pulley 52 solid with the outer ring of a free wheel device 53. In the figures the elastic cord is shown in position ready for flight, that means entirely wound up. This pulley is held against rotation by means of a roller 54 which is turnably secured to the case 50 by a horizontal pivot 55 and bearing brackets 56. The roller 54 is released from the pulley 52 by pulling the arm downwards. This is effected by means of a starting wire 57 extending from the roller end of the arm 58 to a ring 59 at the upper end of the central shaft 60 of the apparatus. The said ring 59 is also attached to one end of a second wire 61, the other end of the wire 61 is adapted to be fixed to an aircraft in such a manner (known in the art) that the wire becomes free from the plane when the falling parachute exerts a sufficiently powerful pull.

When this takes place, the lowering of the roller 54 will free the pulley which will suddenly be rotated by the elastic cord in maximum tension at that moment.

The hub 21 and the blades 1 which are attached to it, will be set into rotation suddenly through the free wheel device 53.

By virtue of their inertia, the blades will hinge around their vertical pivots 8 according to arrow $r$ and will be locked into their flight position by means of the locking device 42, 43.

Figure 6:
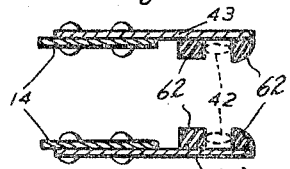
Fig. 6 shows a modified locking device for the blades.

This locking device which locks the blades automatically in their position of flight is similar in principle to the one described in co-pending applications Nos. 598,111 and 598,112 but is now constituted by two half-parts in order to provide a clear space for the passage of the blades and their accessories inside the fork 14. The catch lever 42 is double, each part being attached to the upper and lower wall of the blade, as shown in Figs. 1 and 6, in dotted lines.

The ends of catches 42 will enter by force inside the elastic blocks 62 fixed to the spring plates 43 solid with the upper and lower walls of the fork 14, and the blades will be thus secured in their flight position with a certain degree of elasticity due to the rubber blocks 62.

The elastic locking blocks 43 and 43$^a$ are, respectively attached to the upper and lower part of the fork 14 leaving the space between them free.

It is evident that the invention is not limited to the devices as described, and that many others can be applied which do not alter the principles of the invention.

In fact, instead of utilising an independent mass in order to create a variable centrifugal force which will operate on the pitch angle of the blade when the speed of rotation varies, one part or even the whole blade could be utilised if an elastic stay for the action of the centrifugal force is provided.

Also, the mechanical system comprising inclined track, rod, and rollers, as described above, can be replaced by any suitable mechanism which will change the pitch angle of the blades in the same manner when the centrifugal force on an independent mass or on any part of the rotating system varies.

I claim:

1. A rotating wing parachute comprising a rotatable mounting, a plurality of telescopic blades thereon, said blades being rotatable about longitudinal axes for variation of the pitch angle from a negative value at the start of the fall to a positive value after, a mass slidable on a radial guide, spring means acting on said mass against the centrifugal force developed thereon by rotation and means controlled by said mass for increasing the pitch angle of the blades according to the increase in the rate of rotation of the blades.

2. A rotating wing parachute comprising a rotary body, internal or external mechanism for starting initially the rotation of said body, two or more blades on said body, each comprising telescopic elements sliding freely one in the other stops to limit their sliding movement, and means arranged automatically to increase the pitch angle of the blades from a negative value at the start of the fall to a positive value thereafter, said means comprising mechanism which is operated by the variation of the centrifugal force on an independent mass.

3. A rotating wing parachute according to claim 2 and including a vertical hollow fork providing free space for the blade when in the at-rest position and constituting the vertical hinging support of the blade at the root end of the latter, and thrust ball-bearings for the vertical fork, said ball-bearing seating against a tube rigid with the horizontal fork to allow for the flapping movement of the blade; this horizontal axis of articulation being inclined towards the leading edge with regard to the longitudinal axis of the blades while in operation and passing also adjacent to the vertical axis of rotation of the blades.

4. A rotating wing parachute according to claim 3 and comprising a locking device for the blades in their position of flight, said device being made in two parts, each of them being respectively fixed to the upper and lower horizontal wall of the vertical fork.

5. A rotating wing parachute according to claim 2, wherein the mechanism which increases the pitch angle of the blades is operated by an independent mass rotating with the said blades.

6. A rotating wing parachute according to claim 1 wherein stop means are provided to limit the negative value to which the blades are set before use and the maximum positive value to which they are automatically set by the centrifugal control mechanism.

VITTORIO ISACCO.

REFERENCES CITED

The following references are of record in the file of this patent:

UNITED STATES PATENTS

| Number | Name | Date |
|---|---|---|
| 1,250,263 | Yates | Dec. 18, 1917 |
| 1,876,634 | Desantels | Sept. 13, 1932 |
| 1,915,685 | Mattson | June 27, 1933 |
| 2,023,684 | Hubbell | Dec. 10, 1935 |
| 2,030,578 | Flettner | Feb. 11, 1936 |
| 2,108,245 | Ash | Feb. 15, 1938 |
| 2,216,162 | Cierva | Oct. 1, 1940 |
| 2,265,366 | Hafner | Dec. 9, 1941 |
| 2,294,867 | Bottrill | Sept. 1, 1942 |
| 2,384,767 | Prince | Sept. 11, 1945 |
| 2,435,360 | Leiner | Feb. 3, 1948 |
| 2,440,293 | Stanley | Apr. 27, 1948 |

FOREIGN PATENTS

| Number | Country | Date |
|---|---|---|
| 212,105 | Switzerland | Feb. 17, 1941 |